United States Patent [19]

Melvin, Jr.

[11] Patent Number: 5,907,302
[45] Date of Patent: May 25, 1999

[54] ADAPTIVE ELEVATIONAL SCAN PROCESSOR STATEMENT OF GOVERNMENT INTEREST

[75] Inventor: William L. Melvin, Jr., Rome, N.Y.

[73] Assignee: The United States of America as represented by the Secretary of the Air Force, Washington, D.C.

[21] Appl. No.: 08/994,222

[22] Filed: Dec. 19, 1997

[51] Int. Cl.[6] ............................. G01S 13/53; G01S 7/292
[52] U.S. Cl. ..................... 342/162; 342/140; 342/145; 342/146
[58] Field of Search ..................... 342/159, 160, 342/161, 162, 90, 95, 96, 97, 140, 145, 146, 158, 189, 192, 194, 195, 196

[56] References Cited

U.S. PATENT DOCUMENTS

| H108 | 8/1986 | Gerlach | 342/196 |
|---|---|---|---|
| H792 | 6/1990 | Sanval et al. | 342/17 |
| 3,725,922 | 4/1973 | Brennan et al. | 342/89 |
| 4,028,697 | 6/1977 | Albanese et al. | 342/159 |
| 4,219,812 | 8/1980 | Rittenbach | 342/110 |
| 4,578,676 | 3/1986 | Harrison, Jr. | 342/89 |
| 4,680,589 | 7/1987 | Bryant et al. | 342/196 |
| 4,719,466 | 1/1988 | Farina et al. | 342/159 |
| 5,173,706 | 12/1992 | Urkowitz | 342/99 |
| 5,539,412 | 7/1996 | Mendelson | 342/192 |
| 5,646,623 | 7/1997 | Walters et al. | 342/129 |
| 5,748,143 | 5/1998 | Melvin, Jr. et al. | 342/162 |

Primary Examiner—John B. Sotomayor
Attorney, Agent, or Firm—Harold L. Burstyn

[57] ABSTRACT

A signal processing system applies space-time adaptive processing ("STAP") to an airborne surveillance Doppler radar comprised of a single-channel, electronically scanned antenna. The STAP substantially improves signal-to-interference-plus-noise ratio ("SINR") by synthetically creating angular degrees of freedom, thereby improving the detection of weak targets.

20 Claims, 8 Drawing Sheets

$$X_2(i) = \begin{bmatrix} X(i,1,T) \\ X(i,2,T) \\ X(i,3,T) \\ X(i,1,M) \\ X(i,2,M) \\ X(i,3,M) \\ X(i,1,B) \\ X(i,2,B) \\ X(i,3,B) \end{bmatrix} \qquad X_k(i) = \begin{bmatrix} X(i,j-1,T) \\ X(i,j,T) \\ X(i,j+1,T) \\ X(i,j-1,M) \\ X(i,j,M) \\ X(i,j+1,M) \\ X(i,j-1,B) \\ X(i,j,B) \\ X(i,j+1,B) \end{bmatrix}$$

$$X_1(i) = \begin{bmatrix} X(i,P,T) \\ X(i,1,T) \\ X(i,2,T) \\ X(i,P,M) \\ X(i,1,M) \\ X(i,2,M) \\ X(i,P,B) \\ X(i,1,B) \\ X(i,2,B) \end{bmatrix} \qquad X_P(i) = \begin{bmatrix} X(i,P-1,T) \\ X(i,P,T) \\ X(i,1,T) \\ X(i,P-1,M) \\ X(i,P,M) \\ X(i,1,M) \\ X(i,P-1,B) \\ X(i,P,B) \\ X(i,1,B) \end{bmatrix}$$

FIG. 6

ADAPTIVE ELEVATIONAL SCAN PROCESSOR STATEMENT OF GOVERNMENT INTEREST

STATEMENT OF GOVERNMENT INTEREST

The invention described herein may be manufactured and used by or for the Government for governmental purposes without the payment of any royalty thereon.

BACKGROUND OF THE INVENTION

The present invention describes an adaptive processor for use on an airborne surveillance aircraft with an electronically scanned antenna. Specifically, this invention improves the detection performance of an airborne surveillance radar system by improving its signal-to-interference plus noise ratio ("SINR").

Adaptive processing for airborne surveillance typically involves linearly combining weighted spatial and temporal samples. The adaptive weights, computed via a signal processor, maximize SINR by incorporating the estimated statistics of the dynamically changing signal environment. Increased SINR improves detection of targets. The radar community generally refers to this type of processor as a space-time adaptive processor ("STAP").

Alternatively, a sequence of linear transformations may be applied to the spatial and temporal samples, in which case the STAP can operate in this linearly transformed domain. For example, applying a two-dimensional Discrete Fourier Transform ("DFT") to the spatial and temporal samples provides a linear transformation from the space-time domain to the angle-Doppler frequency domain. In this case, the STAP operates in the angle-Doppler domain by linearly combining weighted angle and Doppler components. The adaptive weights are thus applied in the frequency domain to maximize SINR. Applying the two-dimensional DFT is equivalent to digital beamforming followed by Doppler processing, thereby transforming the spatial samples to angular frequency and temporal samples to Doppler frequency.

The STAP usually applies to an airborne radar with multiple receive channels, thereby yielding multiply-correlated spatial samples. Several combined radiating elements of an antenna form a subarray, and each of the subarrays comprises a channel. A subarray can be oriented horizontally and vertically with respect to the centerline of the aircraft. Spacing among subarrays oriented horizontally allows spatial sampling and discrimination of signals whose direction of arrival ("DOA") varies in azimuthal angular frequency, also called "azimuth".

On the other hand, spacing among subarrays oriented vertically allows spatial sampling and discrimination of signals whose DOA varies in elevational angular frequency, also called "elevation". In contrast, temporal sampling results from the pulse-Doppler mode of typical airborne surveillance radar. An example of a system that provides azimuthal and elevational spatial samples and temporal radar signal samples is a pulse-Doppler, planar, phased-array antenna.

In a common configuration for surveillance radar, a rotating antenna with a single receive channel electronically scans the antenna's transmit-and-receive beam in elevation. This rotating antenna may comprise slotted waveguides stacked vertically. Using fixed analog hardware, each waveguide aperture combines the received signals into a single channel. This step is called analog beamforming. By varying the electronic phase of the waveguide apertures, the beam can scan in elevation. Implementing STAP on such a system typically requires costly hardware modifications or a complete redesign of the system to create multiple spatial channels for conventional STAP operation.

Thus it is desirable to implement STAP in an airborne surveillance platform having a single-channel, electronically scanned antenna without costly redesign and reconstruction of the radar hardware.

SUMMARY OF THE INVENTION

The present invention applies STAP to a single channel, electronically scanned antenna system without modifying the fixed analog radar hardware. The apparatus of the present invention can be easily inserted into the existing signal processing chain by using digital signal processing ("DSP") technology. The STAP system of the present invention uses a frequency domain STAP formulation to operate on Doppler-processed segments of an electronically scanned receive beam.

Briefly stated, the present invention discloses a signal processing system that applies STAP to an airborne surveillance Doppler radar comprised of a single channel, electronically scanned antenna. STAP improves SINR, thereby improving the detection of weak targets. The present invention thus reduces interference signals that emanate from an angle of elevation distinct from a desired target signal's elevation. The single-channel, electronically scanned radar antenna receives both interference and target signals. By synthesizing elevational degrees of freedom, the present invention adaptively cancels the interference signal while passing the target signal with enhanced SINR.

The frequency domain implementation of the STAP can be modified for single channel, electronically scanned antenna radar systems. In this case, the existing analog hardware electronically scans a fixed beam in elevation in a monotonically increasing or decreasing direction. Thus the output of the single radar channel is already at a specific azimuthal angle, and the beam scans physically throughout an angular sector in elevation. While the beam scans electronically, the radar transmits multiple pulses, comprising a single coherent processing interval ("CPI"). Segmenting the CPI into blocks of pulses each corresponding to physically similar angular sectors in elevation is similar to forming a series of beams in elevational angular frequency. Segmenting the CPI as the beam scans thus synthesizes degrees of freedom in elevation. Doppler processing of the multiple temporal pulses in a segment of the CPI that corresponds to a single azimuthal angular frequency and a cluster of angles of elevation provides the transformation to the Doppler frequency domain. The two-dimensional frequency domain implementation of STAP is applied to the Doppler processed multiple segments corresponding to the single radar channel output.

Applying this invention to measured airborne radar data proves the concept.

BRIEF DESCRIPTION OF THE DRAWINGS

FIG. 6 is a diagram of sample signal vectors for a single range cell in the elevational-Doppler domain for the adaptive elevational scan processor.

DETAILED DESCRIPTION OF THE PREFERRED EMBODIMENT

Figure 1:
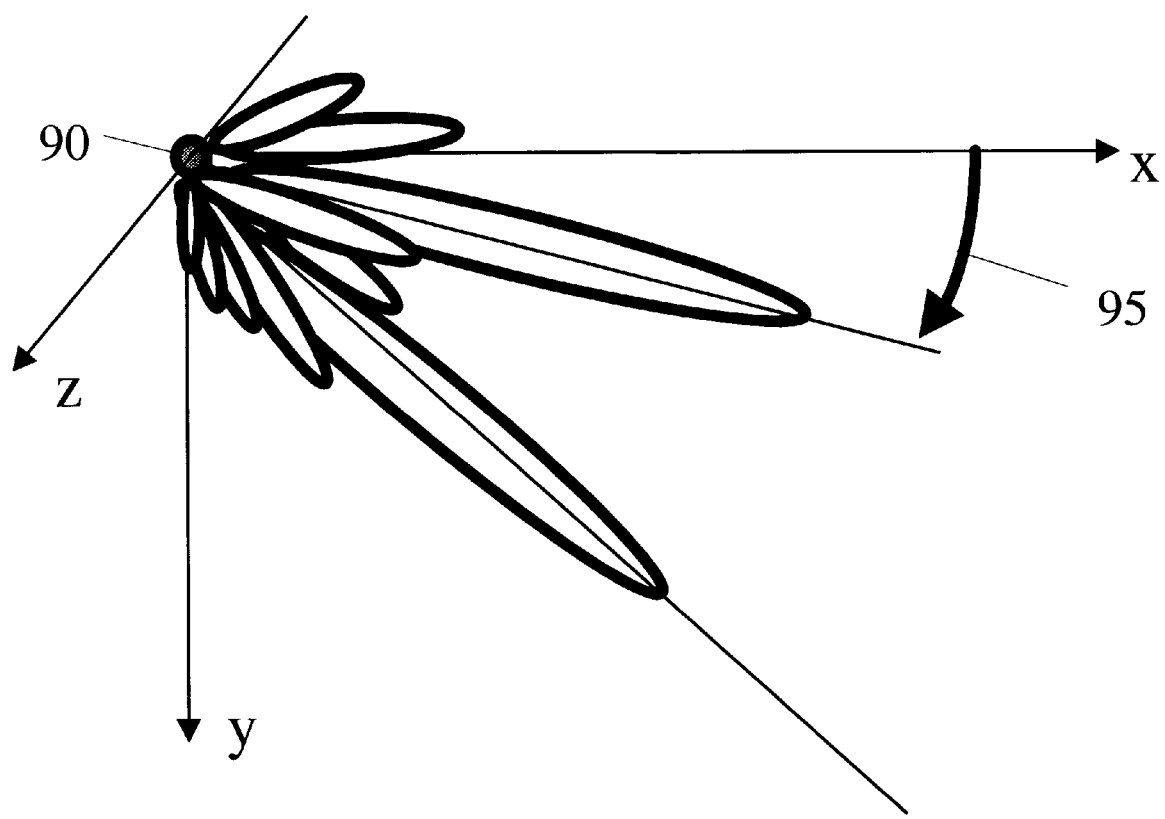
FIG. 1 is an overview of the transmit and receive beam geometry for an airborne radar system with a beam scanning electronically in elevation.

The objective of a STAP system for airborne radar is to enhance the detection of a target by maximizing its SINR. Conventional STAP applications to airborne radar consider multi-channel, pulse-Doppler airborne radar. FIG. 1 depicts the beam pattern of an electronically scanned antenna 90 mounted on an aircraft. Two distinct elevational positions are shown in the figure. The x coordinate aligns horizontal to the earth's surface, the y coordinate is perpendicular to the earth's surface, and the x, y, and z coordinates form an orthogonal set. The x-y plane defines an elevation angle 95; the z-y plane defines azimuthal pointing directions. Typically, the waveguide elements of a rotating antenna transform a beam into a single channel. Next, a phase difference is applied to each element of the waveguide to scan the beam upward or downward in elevation, as defined by the x-y plane. In this case, since only a single channel exists, the conventional application of STAP does not apply.

Figure 2:
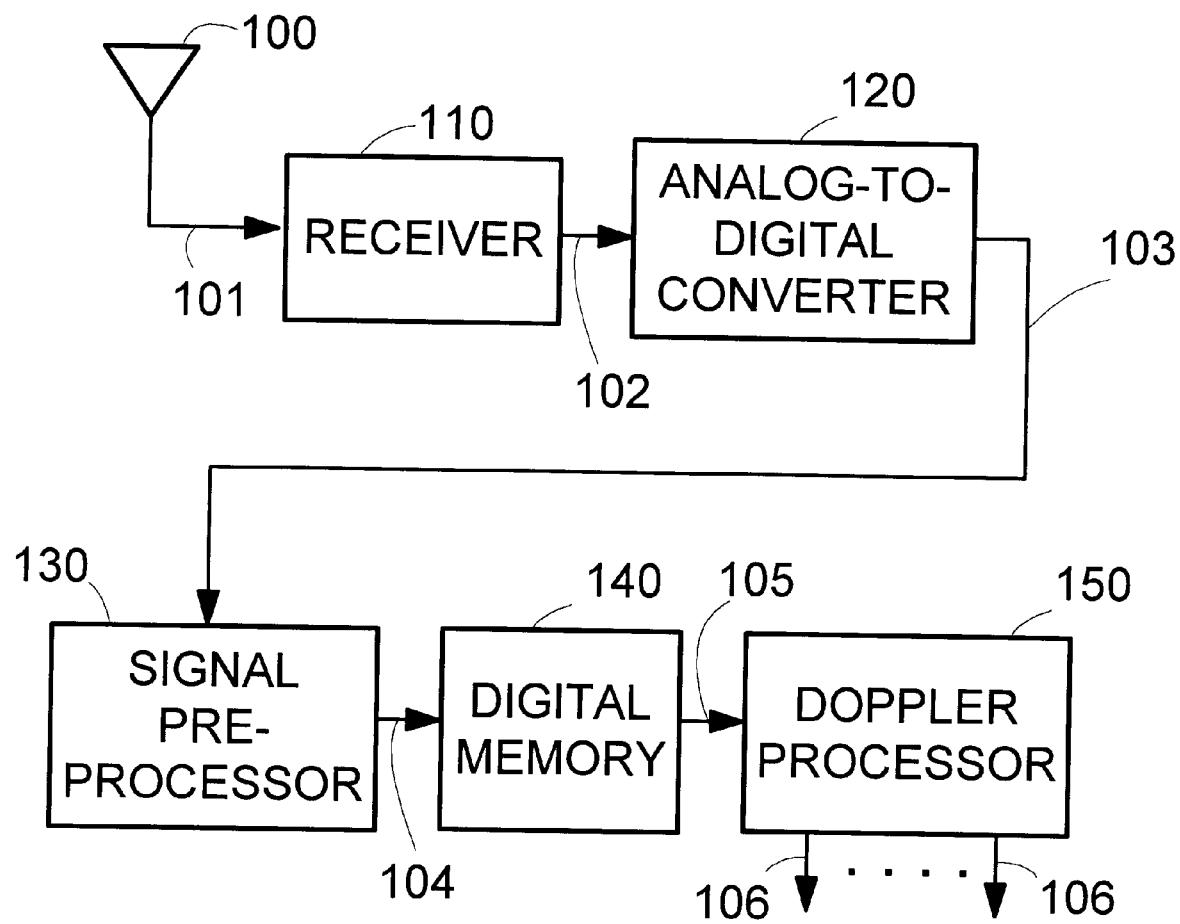
FIG. 2 is a block diagram of a prior-art signal processing chain.

FIG. 2 shows the prior-art signal processing block diagram for a single-channel, airborne, electronically-scanned antenna system. A single receive channel 100 feeds a received radio frequency ("RF") radar signal 101 into a receiver 110. Receiver 110 converts signal 101 to an intermediate frequency ("IF") signal 102. IF signal 102 passes to an analog-to-digital converter 120. Analog-to-digital converter 120 samples IF signal 102. A sampled IF signal 103 enters a signal pre-processor 130 that typically carries out baseband conversion, digital in-phase and quadrature conversion, decimation, and pulse-compression. Signal pre-processor 130 thus outputs a digital, complex, baseband radar signal 104 to a digital memory 140, where radar signal 104 is buffered for subsequent Doppler processing.

Figure 3:
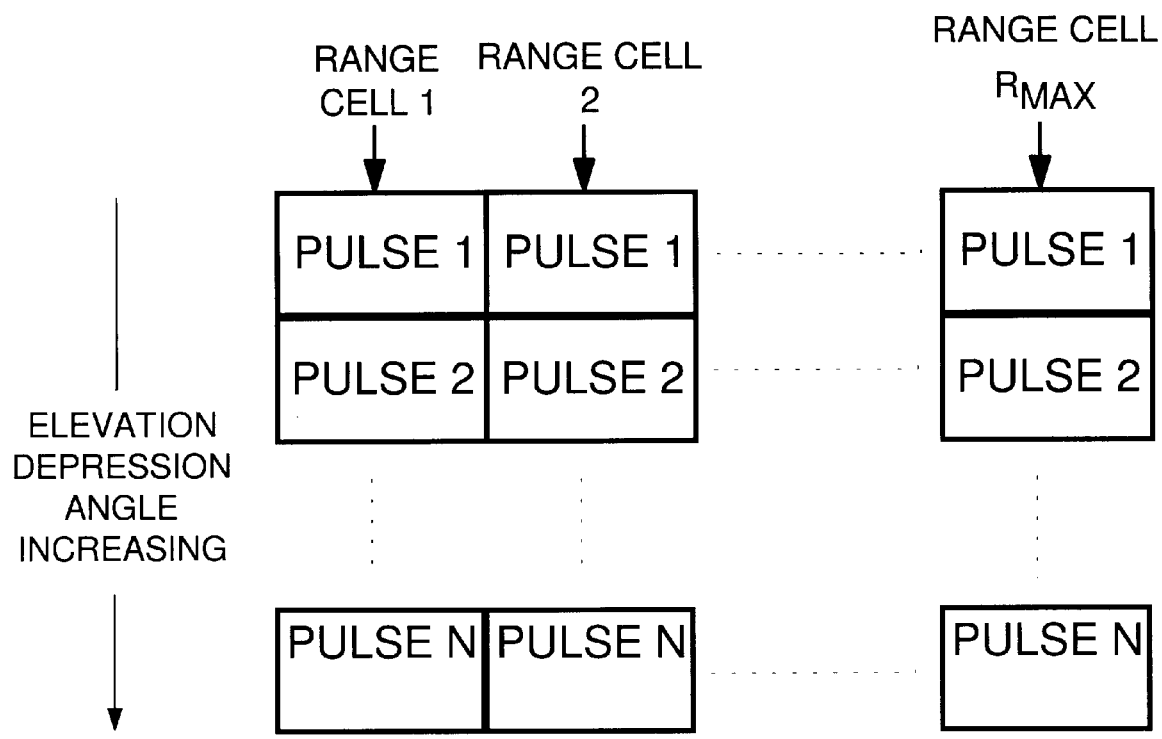
FIG. 3 is diagram of radar signal pulse and range sample organization in digital memory for a single CPI.

FIG. 3 displays the memory storage of each discrete pulse for a selected CPI comprised of N pulses and discrete range cell, k, of $R_{MAX}$ total range cells, as contained in digital memory 140. Referring again to FIG. 2, a signal vector 105 containing the N pulses of the current CPI for range cell k passes to a Doppler processor 150. Doppler processor 150 operates on each column of pulses. Commonly, multiplying signal vector 105 by a weighting function and then applying a fast Fourier transform ("FFT") accomplishes Doppler processing. Doppler processed output 106 is then available for subsequent signal and data processing steps, including detection and tracking.

A high-pass filter (not shown) may be inserted ahead of Doppler processor 150 to mitigate some of the effects of ground clutter returns entering the antenna's main beam. However, other forms of interference, such as jamming and interference exacerbated by anomalous near-field scattering and poor elevational sidelobe response, cannot be canceled with a high-pass filter.

STAP, though it might greatly improve detection by maximizing SINR in environments with interference, including jamming and ground clutter returns that enter the receive aperture from a variety of distinct directions, was not perceived, prior to the present invention, as possible to implement within the confines of a single channel, electronically scanned antenna radar system.

Figure 4:
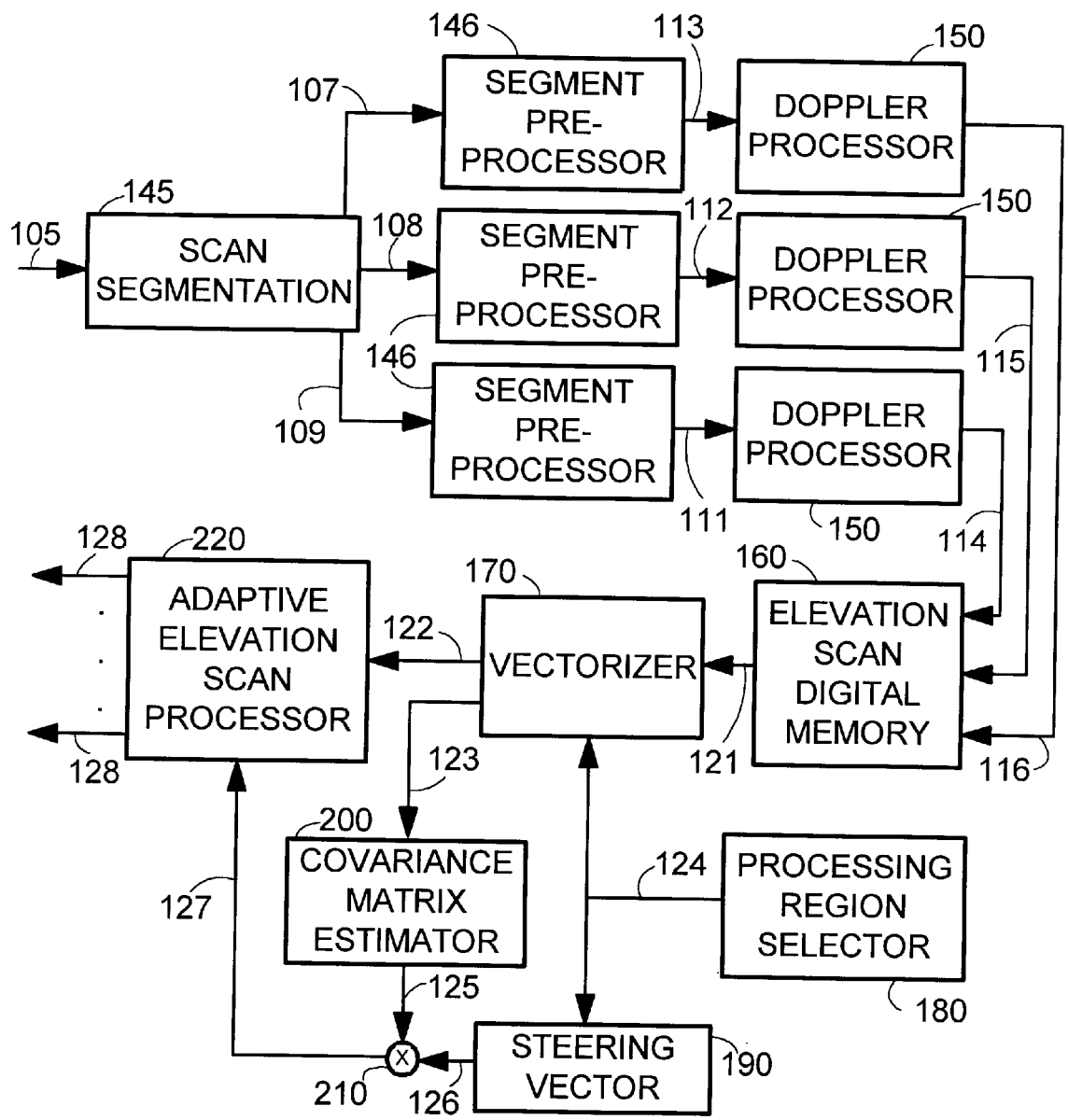
FIG. 4 is a block diagram of the adaptive elevational scan processor.

FIG. 4 shows a block diagram of one example of the adaptive elevation scan processor of the present invention. Signal vector 105, comprised of N pulses for range cell k, passes to a scan segmentation 145 that divides the N pulses sequentially into Q distinct segments. In the example of FIG. 4, Q=3, i.e., scan segmentation 145 divides the N pulses into three segments, each of length N/3. Pulses 1 to N/3 comprise the first segment; pulses N/3+1 to 2N/3, the second segment; and the remaining N/3 pulses, the third segment. For simplicity in describing the present invention, the antenna's beam is assumed to scan electronically in a monotonic, downward direction. Thus, in the Q=3 case shown, the pulses in the first segment represent smaller elevation angles than those in the second segment, and the pulses in the second segment represent smaller elevation angles than those in the third segment. For the electronically scanned antenna, segmentation of the CPI synthesizes elevation degrees of freedom useful to the adaptive processor.

A signal vector 107 containing the bottom third of the N pulses passes to a first segment pre-processor 146. Likewise, a signal vector 108 containing the middle third of the N pulses passes to a second segment pre-processor 146, and a signal vector 109 containing the top third of the N pulses passes to a third segment pre-processor 146. Each segment pre-processor 146 applies a window function to the pulses in each segment and zero-pads the result to make each segment the same length. Then each segment is individually Doppler-processed. Thus a signal vector 113 containing the pre-processed bottom third segment enters a first Doppler processor 150, a signal vector 112 containing the pre-processed middle third segment enters a second Doppler processor 150, and a signal vector 111 containing the pre-processed first segment enters a third Doppler processor 150. Subsequently, a multiple of Doppler-processed outputs 114 for the top third segment, a multiple of Doppler-processed outputs 115 for the middle third segment, and a multiple of Doppler-processed outputs 116 for the top third segment all enter an elevation scan digital memory 160. Each Doppler processor 150 yields P distinct outputs, commonly known as Doppler bins, which comprise the multiple of Doppler-processed outputs 114, 115, 116 respectively.

Figure 5:
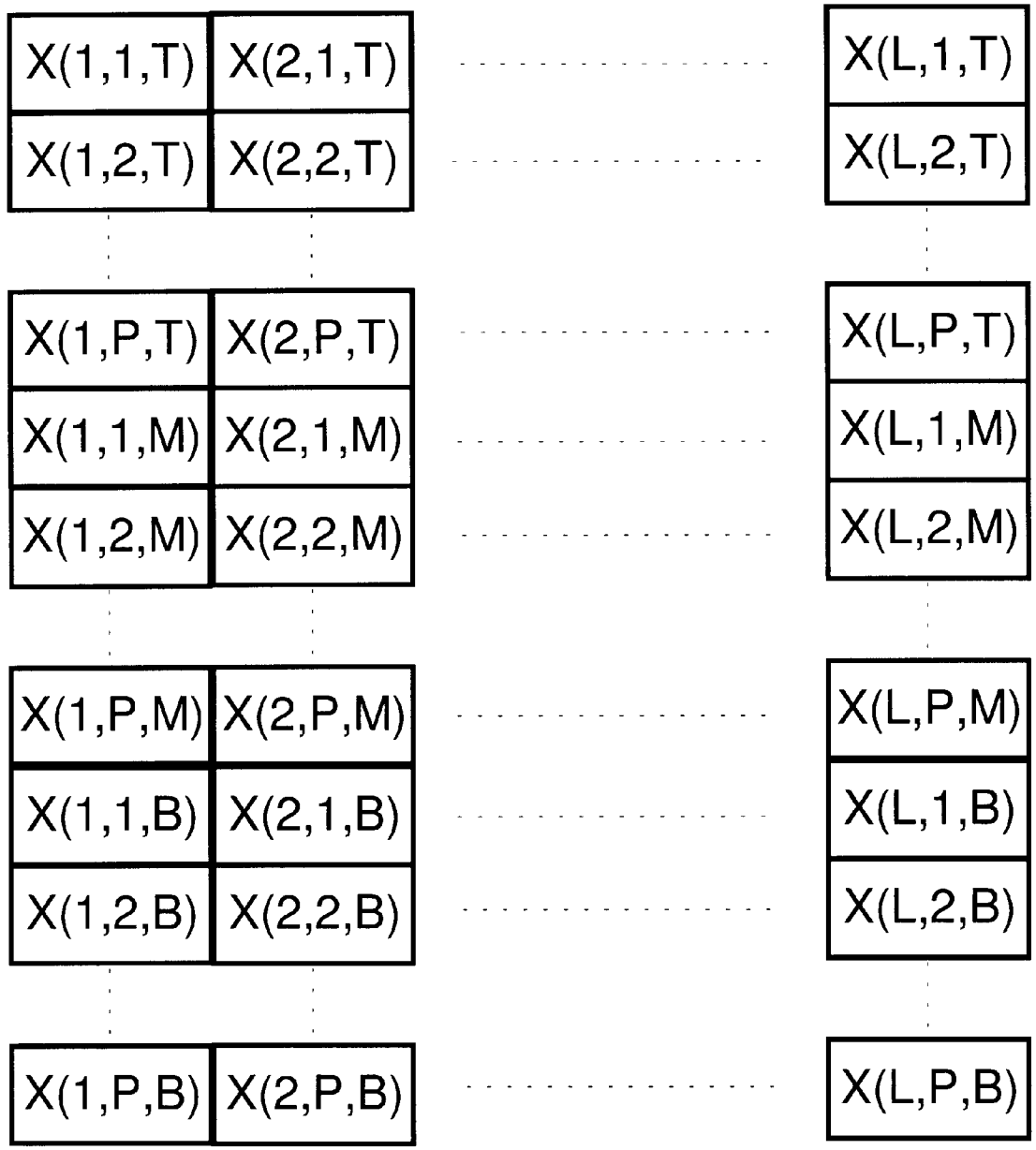
FIG. 5 is a diagram of radar signal sample organization for the adaptive elevational scan processor after Doppler processing.

FIG. 5 shows the memory organization of elevation scan digital memory 160. Doppler-processed outputs for all processed segments comprise the rows; measurements that correspond to each discrete range cell comprise the columns of the memory storage. The variable notation used in the figure, X(k,n, EP), indicates the $n^{th}$ measured pulse value at range cell k for elevational position EP, where EP equals T for the top segment, M for the middle segment, and B for the bottom segment. If adaptive elevation scan processor 220 uses a different number of segments the notation changes. And $L=R_{MAX}$.

A processing region selector 180 determines the size of each of D processing regions, nominally taken as three adjacent Doppler bins from each of the three segments. Typically D=P, so that the processor covers each of the P Doppler bins. Data from each processing region is adaptively combined to maximize SINR within that region. For example, the second processing region includes Doppler bins 1 through 3 for segments T, M, and B. Thus adaptive elevation scan processor 220 adaptively weights these nine components one at a time to maximize the SINR of a potential target signal that occupies any of them. Processing regions 1 and P require wrapping-around to the other end of memory. In other words, for the nominal case, the Doppler bins P, 1, and 2 for segments T, M, and B define processing region 1, and Doppler bins P−1, P, and 1 for segments T, M, and B define processing region P.

There is no requirement that all processing regions be of the same size. However, every Doppler bin for a selected beam position should be covered. For simplicity, the following discussion assumes that all processing regions are of the same dimension, M * Q, where M defines the number of selected adjacent Doppler bins and Q the number of segments. In the nominal case, M=3, Q=3, and thus M*Q=9. The processing region dimension passes as a signal 124 from processing region selector 180 to a vectorizer 170 and a steering vector 190.

Vectorizer 170 accepts selected parts of the data stored in elevation scan digital memory 160 as signal 121 according to the dimension of designated processing regions and the number of range cells required by a covariance matrix estimator 200 and adaptive elevation scan processor 220. The nominal value of range cells required to filter range cell k is eighteen. In general, if the processing region is M by Q, then covariance estimation requires 2*M*Q range cells. The range cells required for covariance matrix estimation, referred to as secondary data, include the M*Q range cells on either side of range cell k and its guard cells. The number of guard cells selected depends on the signal environment. Fewer guard cells ensures that the covariance matrix estimate comes from samples closest to the range cell to be adaptively processed, commonly called the test cell.

Consider, as an example, the case where two guard cells are placed on each side of the test cell, and the secondary data is selected symmetrically in range about this test cell. Then secondary data comes from range cells k−2−M*Q to k−3 and k+3 to k+2+M*Q, since covariance matrix estimator 200 excludes range cell k and its guard cells at k−2, k−1, k+1 and k+2 to avoid whitening a potential target.

For each processing region, vectorizer 170 outputs data vectors 122 for the range cells to be adaptively processed, and a sequence of adjacent vectorized secondary data 123 for covariance matrix estimation. FIG. 6 shows an example of the format of this vectorized data for range cell k and several processing regions. $X_2(i)$ in the figure is the vectorized format for the $i^{th}$ range cell and processing region two (2); $X_j(i)$, for the $i^{th}$ range cell and processing region j.

FIG. 6 shows processing regions one (1) and P as separate cases as in the preceding discussion. This format corresponds to stacking selected elements from the $i^{th}$ column of the data stored in elevation scan digital memory 160 for each of the three distinct segments T, M, and B. The secondary data from adjacent range cells has an identical format.

Referring again to FIG. 4, covariance matrix estimator 200 estimates the frequency domain interference covariance matrix by summing the outer products of vectorized secondary data 123 over the range for each processing region and dividing by the total number of outer products in the summation. For example, for processing region j and range cell k, the covariance matrix estimate is:

$$R_k^{(j)} = \frac{1}{Ks}\left(\sum_{i=k-2-V}^{k-3} X_j(i)X_j^H(i) + \sum_{k+3}^{k+2+V} X_j(i)X_j^H(i)\right),$$

where V=M*Q, Ks=2*V, and the superscript H is the conjugate transpose. This computation assumes two guard cells on each side of range cell k.

Steering vector 190 takes a very simple form in the frequency domain. Signal 124 enters steering vector 190 to indicate the size of the processing region. Since all processing regions are assumed to have the same dimension, M by Q, steering vector 190 has a length of M*Q by one. In the frequency domain, steering vector 190 has a value of unity for the elevation segment-Doppler bin of interest and zero elsewhere. For example, in the case of three adjacent Doppler filters by three segments, steering vector 190 is S=[0 1 0 0 0 0 0 0 0]$^T$, where the superscript "T" denotes the transpose operation. S defines the desired target signal to reside in the second of the three adjacent Doppler filters and the top segment, which latter corresponds to the smallest elevation angles. In another example, S=[0 0 0 0 1 0 0 0 0]$^T$ defines the desired target signal to coincide with the middle Doppler bin and the middle segment of the chosen processing region.

A covariance matrix estimate 125 for the $j^{th}$ processing region and a steering vector 126 enter a multiplier 210. The output of multiplier 210 is an adaptive weight vector 127 to be used for processing range cell k. The frequency domain adaptive weight vector 127 for the $j^{th}$ processing region and $k^{th}$ range cell is expressed as:

$$W_k^{(j)} = S^H(R_k^{(j)})^{-1}.$$

Since S is real, the conjugate transpose operation reduces to the simpler transpose operation. Also, all but one of the components of S are zero, further reducing computational complexity. The weight vectors for all P processing regions consecutively enter adaptive elevation scan processor 220 along with a data vector 122 that corresponds to the $k^{th}$ range cell to be adaptively processed. Each data vector 122 is of the form shown in FIG. 6.

Adaptive elevation scan processor 220 produces a multiple of outputs 128 for each processing region, or, equivalently, each Doppler bin. Each output 128 corresponds to adaptively processed data vector 122 and ideally yields a dramatically improved SINR over conventional processing. Output 128 for the $j^{th}$ processing region, corresponding to the $j^{th}$ Doppler bin and $k^{th}$ range cell, is given as:

$$Y_k^{(j)} = W_k^{(j)} X_k^{(j)}.$$

Thus, P signals, $Y_k^{(1)}, Y_k^{(2)}, \ldots, Y_k^{(j)}$, comprise output 128 for the $k^{th}$ range cell. These outputs 128 can then be processed further, for example, by detection and tracking, as in the prior art as shown in FIG. 2.

AIRBORNE MEASURED DATA ANALYSIS AND RESULTS

Figure 7:
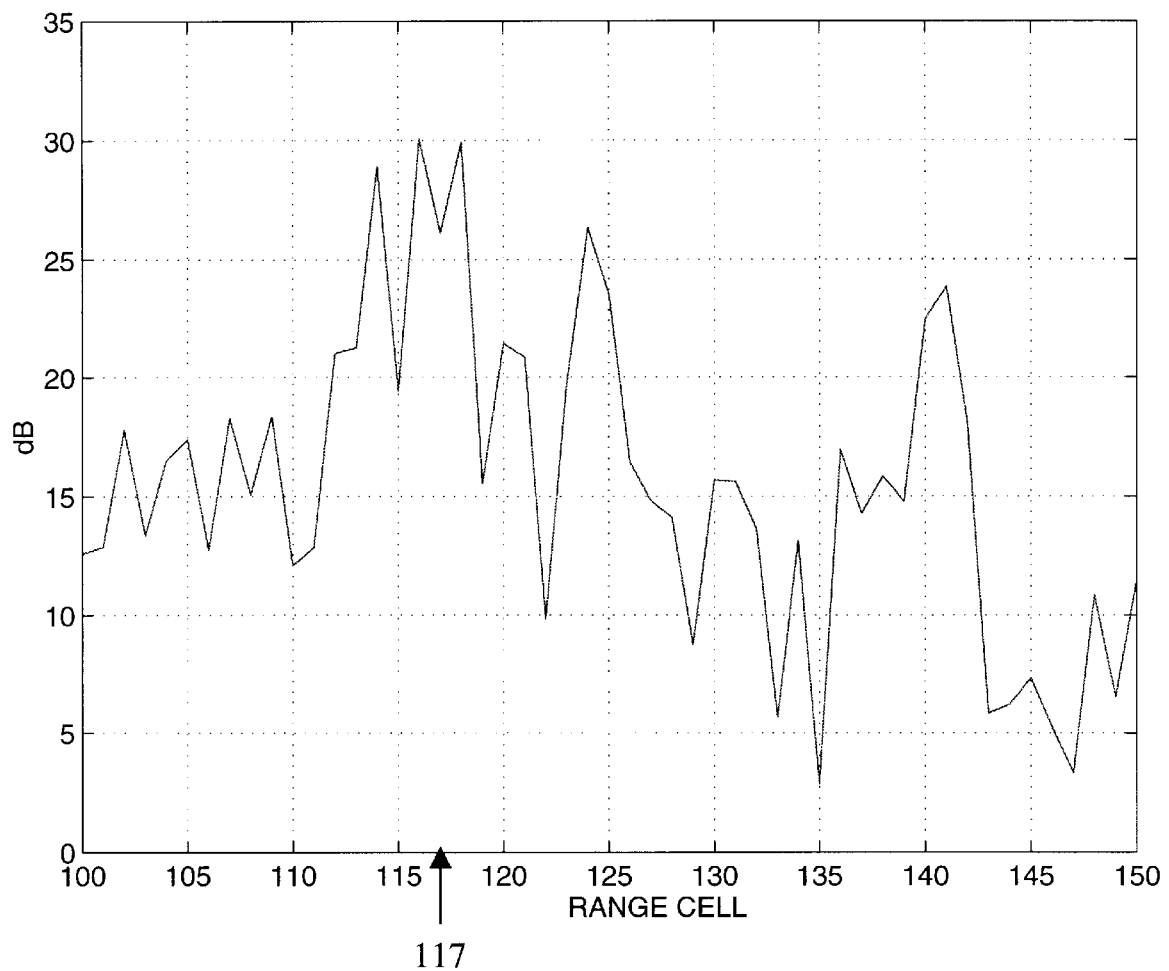
FIG. 7 shows the output of a Doppler filter versus range for the prior-art signal processing.
Figure 8:
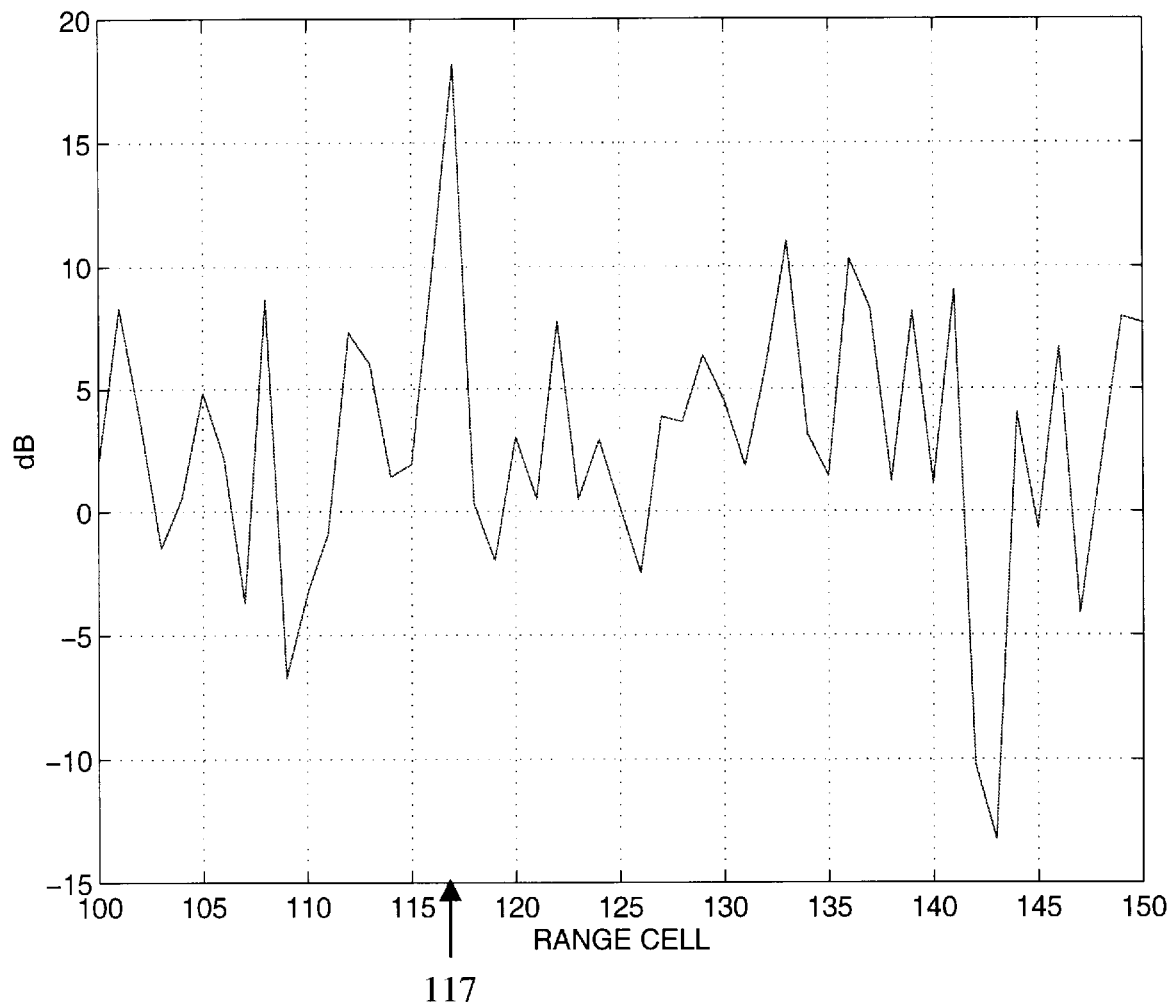
FIG. 8 shows the output of the adaptive elevational scan processor of the present invention for Doppler filter versus range.

Referring to FIGS. 7 and 8, analysis of measured airborne radar data verified the utility of the present invention. This analysis used a single CPI of measured data from a single channel, electronically scanned antenna. The beam scanned electronically in elevation. Prior to any signal processing steps, a target-like signal was injected into the top third of the CPI at Doppler bin 103 and range cell 117. It was assumed that a target signal appears in only part of the CPI as the antenna scans, a likely occurrence. (The scanning mode generally operates in a search mode to acquire new targets from a large surveillance volume.)

FIG. 7 shows the output of the prior-art conventional processing for Doppler 103 versus range. A Hanning window function is applied to the pulses prior to Doppler processing. Anomalous interference, in this case from ground clutter, appears between range cells 110 and 120, masking the target signal at range 117. Declaration of a target occurs when the signal at a given range crosses a pre-determined threshold. The threshold setting is a trade-off between target detection and the desired false-alarm rate. False-alarm rate is thus a critical design parameter. In this case, there is no way to detect the target at range 117 without passing an unacceptable number of false alarms because of the presence of strong interference returns in nearby range cells. If the threshold is raised to avoid interference crossings, then the target will clearly go undetected. The use of conventional processing, including the addition of deterministic filters and airborne moving target indicator ("MTI") cannot reduce this anomalous interference, because the interference can vary in Doppler and range from one CPI to the next.

The adaptive elevation scan processor of the present invention adjusts the adaptive weights to maximize SINR by exploiting both degrees of freedom in Doppler and the synthesized elevation degrees of freedom. FIG. 8 shows the output of adaptive elevation scan processor 220 for Doppler bin 103 versus range, corresponding to the range interval shown in FIG. 7. A simple normalization of the form $(S^H(R_k^{(l)})^{-1}$ is applied to the output of adaptive elevation scan processor 220 to embed a constant false alarm rate ("CFAR") characteristic. FIG. 8 shows that the adaptive elevation scan processor successfully uncovers the target and suppresses the interference. In this case, nearly 7.5 dB separation exists between the target and the next highest interference peak. The detection threshold can be set at a higher level, allowing detection of the target while avoiding false alarms from spurious interference that crosses a lower threshold. In the analysis shown, the processing regions contain three adjacent Doppler filters by three equal segments of the CPI divided into top, middle and bottom portions. This analysis shows that the interference emanates from an elevation angle distinct from that of the target injected into the top third of the CPI, which corresponds to smaller elevation angles. Much of the interference appears to originate at larger elevation angles aligned more closely with the middle and bottom segments of the CPI.

Thus comparing FIG. 8 to FIG. 7 shows that the present invention improves the detection performance of airborne radar employing a single-channel, electronically scanned antenna. This improvement in performance is dramatic compared to conventional processing. The present invention offers dramatic gains in single channel, electronically scanned antennas whenever the interference correlates with the scanning coordinates. This invention is equally applicable if the scanning occurs in a direction other than elevation, as shown in FIG. 1. Furthermore, the present invention is a low-cost alternative to upgrading existing single channel antenna designs with costly hardware modifications to add extra channels. Without tests, these extra channels may not even provide the desired improvement in performance.

Clearly many modifications and variations of the present invention are possible in light of the above teachings. It should therefore be understood that, within the scope of the inventive concept, the invention may be practiced otherwise than as specifically claimed.

What is claimed is:

1. In a system for processing signals that employs a single receive channel, a method for space-time adaptive processing of said signals comprising the steps of:

receiving a plurality of signals from an area potentially containing at least one target;

moving said single receive channel to combine said plurality of signals into a plurality of groups, each of said groups representing a distinct processing segment from a single coherent processing interval, each of said distinct processing segments corresponding to multiple spatial orientations;

correlating an interference component of said signals over a plurality of said distinct processing segments, whereby said step of correlating yields correlated interference for each of said distinct processing segments; and canceling said correlated interference by adaptively combining said plurality of signals by means of an adaptive filter, whereby interference obscuring said at least one target is reduced.

2. The method of claim 1, wherein said step of moving combines said plurality of signals into at least three groups as follows:

a first group comprising a segmented coherent processing interval within which a potential target may be located;

a second group comprising segmented coherent processing intervals adjacent said first group; and a third group comprising secondary signals used for determining adaptive weights.

3. The method of claim 2, wherein said step of correlating uses said second group to determine said interference component to be applied in said step of canceling to said first group.

4. The method of claim 1, wherein said step of receiving comprises obtaining said plurality of signals from a pulse Doppler radar with a single electronically scanned antenna.

5. The method of claim 4, wherein said plurality of signals is obtained by transmitting and receiving at a plurality of distinct time intervals each of which corresponds to a specific spatial orientation, that is, to a specific angular direction of said single electronically scanned antenna.

6. Apparatus for space-time adaptive processing of signals from which to identify one of presence and absence of at least one potential target, said apparatus including a single receive channel, which comprises:

means for receiving a plurality of signals from an area potentially containing at least one target;

means for moving said single receive channel to combine said plurality of signals into a plurality of groups, each of said groups representing a distinct processing segment from a single coherent processing interval, each of said distinct processing segments corresponding to multiple spatial orientations;

means for correlating an interference component of said signals over a plurality of said distinct processing segments, thereby yielding correlated interference for each of said distinct processing segments; and means for canceling said correlated interference, said means including an adaptive filter for adaptively combining said plurality of signals, whereby interference obscuring said at least one potential target is reduced.

7. Apparatus as in claim 6, wherein said apparatus including a single receive channel is a pulse Doppler radar with an electronically scanned antenna.

8. Apparatus as in claim 6, wherein said means for correlating includes a steering vector generator and a covariance matrix.

9. Apparatus as in claim 6, wherein said means for canceling includes an adaptive elevational scan processor.

10. Apparatus as in claim 7, wherein said pulse-Doppler radar is airborne.

11. Apparatus as in claim 7, wherein said pulse-Doppler radar has a variable pulse repetition frequency.

12. Apparatus as in claim 6, wherein said apparatus including a single receive channel is a ground-based radar system.

13. Apparatus as in claim 6, wherein said apparatus including a single receive channel is a shipboard radar system.

14. Apparatus for space-time adaptive processing of signals from which to identify one of presence and absence of at least one potential target, which comprises:

a device having a single channel for receiving said signals;

said device being adapted for scanning continuously through a series of positions;

said device occupying said series of positions consecutively to receive, when in each of said series of positions, each of a sequence of said signals;

means for segmenting said sequence into at least two groups;

means for transforming each of said at least two groups; and a signal combiner adapted for weighting and summing said transformed groups to cancel interference components thereof, whereby said at least one potential target is unmasked.

15. Apparatus as in claim 14, wherein said device is a pulse Doppler radar with an electronically scanned antenna.

16. Apparatus as in claim 14, wherein said signal combiner includes a steering vector generator, a covariance matrix estimator, and an adaptive elevational scan processor.

17. Apparatus as in claim 15, wherein said pulse-Doppler radar is airborne.

18. Apparatus as in claim 15, wherein said pulse-Doppler radar has a variable pulse repetition frequency.

19. Apparatus as in claim 14, wherein said device is a ground-based radar system.

20. Apparatus as in claim 14, wherein said device is a shipboard radar system.

\* \* \* \* \*

UNITED STATES PATENT AND TRADEMARK OFFICE
CERTIFICATE OF CORRECTION

PATENT NO. : 5,907,302
DATED : May 25, 1999
INVENTOR(S) : William L. Melvin, Jr.

It is certified that error appears in the above-indentified patent and that said Letters Patent is hereby corrected as shown below:

On the title page, [54] and Column 1, lines 1-3: Change the title to read -- ADAPTIVE ELEVATIONAL SCAN PROCESSOR.--

Signed and Sealed this

Twelfth Day of October, 1999

*Attest:*

Q. TODD DICKINSON

*Attesting Officer*   Acting Commissioner of Patents and Trademarks